United States Patent

[11] 3,546,992

| | | |
|---|---|---|
| [72] | Inventor | Helmbrecht Muller<br>Pirmasens, Germany |
| [21] | Appl. No. | 701,445 |
| [22] | Filed | Jan. 29, 1968 |
| [45] | Patented | Dec. 15, 1970 |
| [73] | Assignee | Firma Schon & Cie GmbH<br>Pirmasens, Germany |
| [32] | Priority | Feb. 9, 1967 |
| [33] | | Germany |
| [31] | | No. Sch 40193 |

[54] LARGE AREA OR PLATFORM-TYPE BEAM CUTTING MACHINE
8 Claims, 6 Drawing Figs.

[52] U.S. Cl. .................................................. 83/417,
83/29, 83/280, 83/437, 83/562
[51] Int. Cl. .................................................. B26d 7/06,
B26d 7/20
[50] Field of Search .......................................... 83/29, 279,
280, 417, 437, 648, 562

[56] References Cited
FOREIGN PATENTS
1,036,732  7/1966  Great Britain ................ 83/29

*Primary Examiner*—James M. Meister
*Attorney*—Friedman & Goodman

ABSTRACT: A large area or platform-type beam cutting machine having lateral guiding frames for the cutting table, delivery table equipped and adapted to advance over the cutting table, said delivery table provided with a conveyor belt positioned on said delivery table and drive means operatively connected to said conveyor belt, said drive means being operative in response to the relative movement between the tables, whereby the relative movement of said cutting table, said delivery table and said conveyor belt are such that material positioned on said conveyor belt to be cut remains immovable relative to said cutting table during delivery of said material.

PATENTED DEC 15 1970 3,546,992

INVENTOR.
HELMBRECHT MÜLLER
BY 3,546,992

LARGE AREA OR PLATFORM-TYPE BEAM CUTTING MACHINE

BACKGROUND OF THE INVENTION

1. Field of the Invention

This invention relates to a large area or platform-type beam cutting machine having lateral guiding frames for the cutting table, and a delivery table equipped and adapted to advance over the cutting table. Machines of this type are used for DESCRIPTION OF THE DRAWINGS packets assembled form numerous layers of textiles, synthetic fabrics, etc. The material therefor is either taken off a delivery roll by hand, cut off and stacked into a packet, or arranged in this manner by means of a stacking machine and then cut.

2. Discussion of the Prior Art

The difficulty in such an operation is encountered in the delivery of such a stacked packet to the cutting table or the cutter blades disposed thereon. The delivery table can be arranged directly adjacent the cutting table and the fabric pulled by hand onto the latter or onto the cutter blades themselves. In prior art equipment, the cutting table can be advanced over an extension of the guiding frames so as to travel underneath the delivery table. The stacked up packet is then pulled by hand and slightly downwards from the delivery table and attached or suspended at the front end of the cutting table. When the latter moves from underneath the delivery table and in the direction of the cutter, the material thereon is pulled off with it.

This and other working procedures have a common shortcoming which becomes particularly pronounced when working with light fabrics such as nylon and the like. When a long stacked pack is pulled off, considerable tension is created in the material, which causes stretching of the same. When the fabric length is subsequently cut up and removed from the delivery table, the material contracts into its original length and the cutouts do not fit properly.

SUMMARY OF THE INVENTION

The measures provided by this invention help to eliminate this disadvantage. The invention resides in that the delivery table is provided with a conveyor belt and the drives for the latter and/or the delivery table and/or the cutting table are so coupled together that that portion of the conveyor belt which is covered by the fabric to be cut does not move relative to the cutting table during the delivery of the material. It then becomes possible to drive the conveyor belt in such a way that it delivers the stacked packet onto the cutting table while the latter remains immovable relative to the upper length of the belt.

In one embodiment of the invention, the delivery table is made movable over the guiding frame, and its drive is so coupled with that of the conveyor belt that the delivery table and the upper length of the belt move in opposite directions and at the same speed. The device is driven in such a manner that when the material to be cut is delivered, the delivery table remains immovable and the cutting table is moved, the conveyor belt being so driven depending on the movement of the cutting table that the movement of its upper length is entirely synchronized with the movement of the cutting table.

In the first-described case, the drive for advancing the table and that actuating the conveyor belt are common.

It may prove advantageous to have a freewheeling movement provided in the conveyor belt in the direction towards the cutter beam.

One embodiment of the invention consists of two pinions having a like number of teeth in intermeshing relationship; they are both journalled in the delivery table frame; one of the pinions moves over a rack on the guiding frame and the other drives the shaft of a driving roller of the conveyor belt. The operation procedure is such that the cutting table remains immovable when the stacked packet is delivered. In this case, the freewheel arrangement is preferably in effect between the pinion and the shaft of the driving roller.

Disengageable coupling or clutch means can be provided instead of the freewheel arrangement. This makes it possible to move the conveyor belt frame both backwards and forwards and to fix the position of the belt movement in any desired location.

DESCRIPTION OF THE DRAWINGS

The figures of the appended drawing show an embodiment of the invention as follows.

DISCUSSION OF THE PREFERRED EMBODIMENTS

Figure 1:
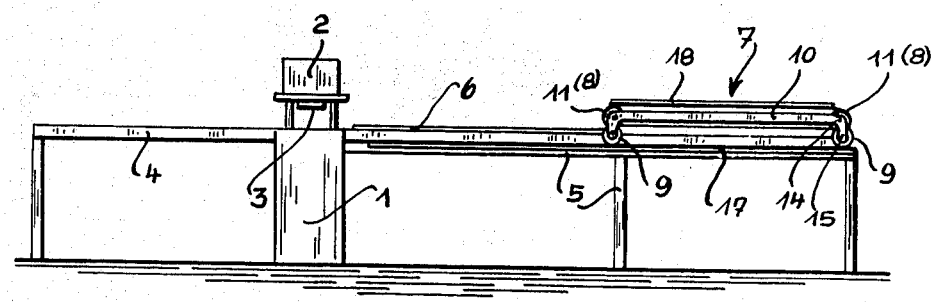
FIG. 1 is a front view of the machine in its initial position.

Referring now to FIG. 1, the cutting machine is identified by reference numeral 1, the cutting beam is 2, a cutting blade is 3, the guiding frame members are 4 and 5 respectively, the cutting table table the delivery table 7, the conveyor belt is 7a, the driving rollers therefor 8, pinion members are 9 and 11, and the delivery table frame 10.

The cutting machine proper 1 is arranged in the center of the installation. On both sides thereof are the guiding frames 4 and 5 for the cutting table 6. A frame 10 for the delivery table 7 moves on guiding frame 5. The latter is extended far enough towards the right-hand side of the figure for the conveyor belt to clear entirely the cutting table 6.

Cutting table 6 can be moved under cutting beam 2 either manually or mechanically, driven by an electric motor or other suitable means. As a rule, it moves thereunder step by step, cutting movement and talble movement following one another, until the entire fabric of the stacked packet 18 present on the cutting table is processed. The cut up textile can be removed from cutting table 6 as per individual requirements, either on the side facing frame 4 or that facing frame 5.

Conveyor belt 7a which travels over rollers 8 is made of rubber or a synthetic material having a textile core embedded therein. It is guided, driven and tensioned by one or both rollers 8. To this purpose, at least one of the rollers 8 has a shaft 14 journalled for rotation in frame 10. A sleeve 13 is secured to shaft 14 by steel pins or the like. A freewheel arrangement 12 is disposed on sleeve 13; the outer race of the freewheel arrangement 12 is press-fitted into the throat of a pinion 11.

Figure 2:
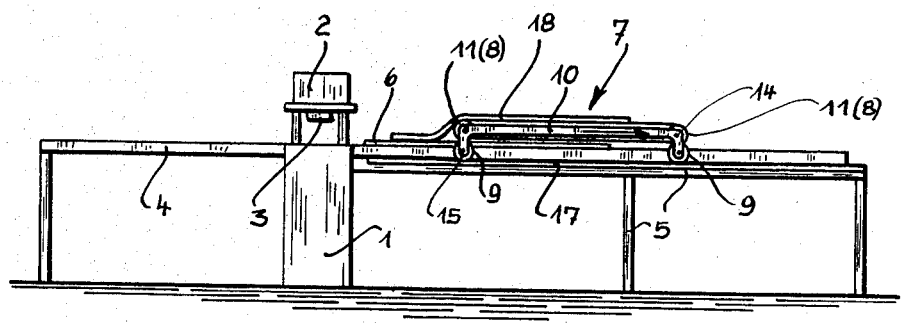
FIG. 2 shows the same view at the moment when the stacked packet is delivered.

Pinion 11 rotates freely on shaft 14 and meshes with a counter-pinion 9. The shaft of the latter is identified with reference numeral 15 (FIGS. 1 and 2).

A rack 17 is fixedly attached alongside guiding frame 5 and extends over the entire travel range of delivery table 7. Pinion 9 travels over rack 17. The casters on which frame 10 travels over a separate rail are not shown in the FIGS.

Figure 3:
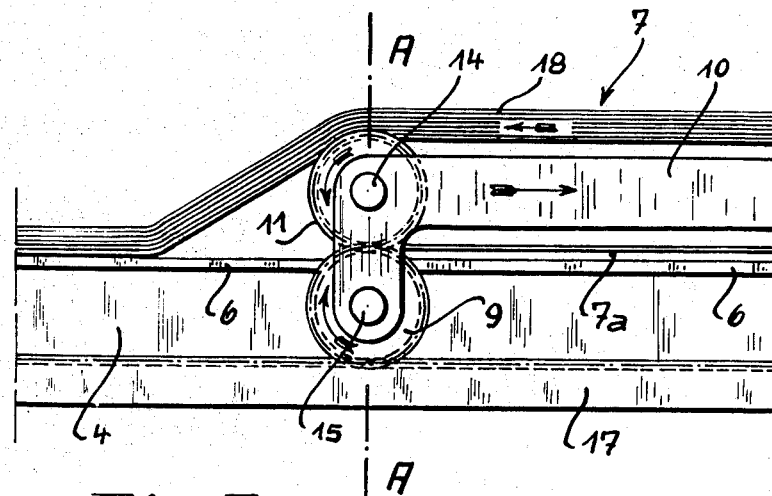
FIG. 3 shows a detail from FIG. 2.

Delivery table 7 can be moved manually over cutting table 6. This has the effect of actuating the conveyor belt 7a in the direction indicated by an arrow (FIG. 3) so that the belt moves at a speed equal to that of the delivery table. Since the cutting table remains immovable at the moment and the counter-pinion or pinions 9 mesh with rack 17 and with pinion or pinions 11, each point on the upper length of the conveyor belt 7a remains above the corresponding point on the cutting table 6.

The stacked packet 18 is delivered onto cutting table 6 without any special provisions therefor.

Due to the freewheel arrangement 12, conveyor belt 7a is not driven when delivery table 7 is displaced at the cutting machine 1.

Figure 4:
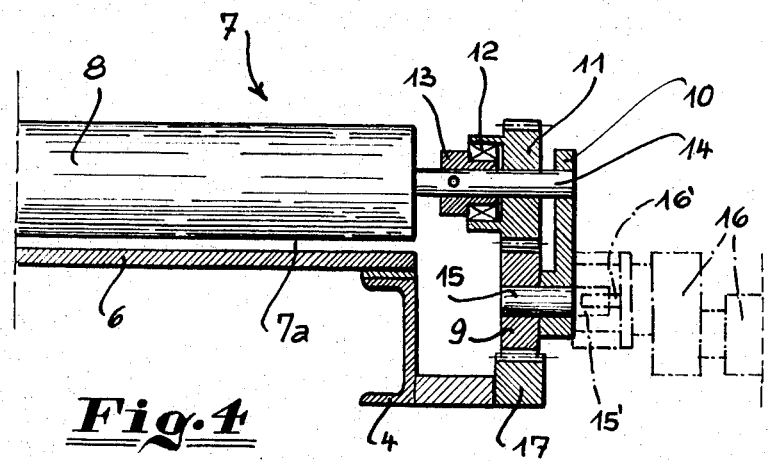
FIG. 4 is a section along line A—A of FIG. 3.

As indicated by a dash-dot line (FIG. 4), delivery table 7 may be driven by means of a motor or any other suitable drive means. In such a case, shaft 15 of counter-pinion 9 would have to be extended by a length 15' engaging an output shaft 16' of a geared motor 16.

Figure 5:
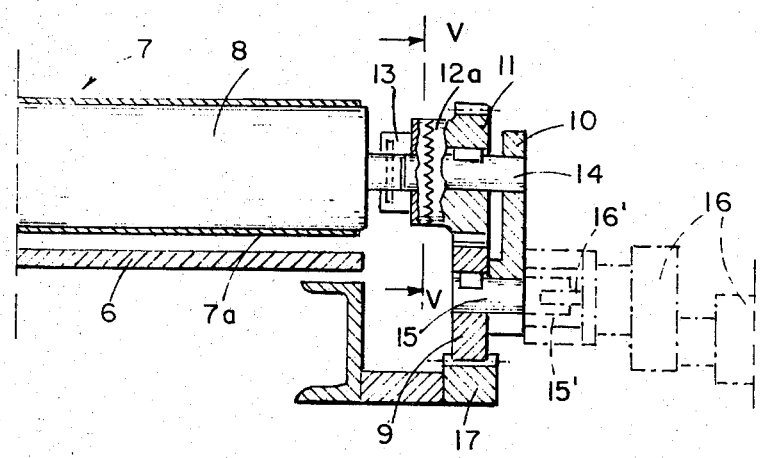
FIG. 5 is a section similar to FIG. 4.
Figure 6:
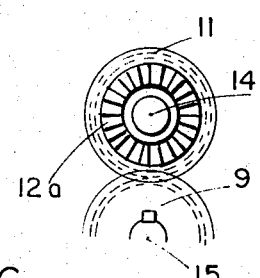
FIG. 6 is a section taken along the line V—V of FIG. 5.

If the freewheel arrangement 12 is replaced by a clutch 12a, (as seen in FIGS. 5 and 6) there is an advantage in that in a declutched position the entire conveyor belt can be moved freely in both directions. It can then be brought into the desired position above the cutting table 6. The clutch can be engaged while the belt travels towards the right, and thus the stacked packet 18 brought onto the cutting table 6. At the same time, the frame is returned towards the right into its initial position. When a freewheel arrangement is used this freedom of movement is lacking since it engages at the moment of the return travel.

In the initial position, the delivery table 7 is at the right-hand end of the guiding frame 5, as shown in FIG. 1. In this position, the textile which is to be cut is deposited layer by layer, manually or by means of a stacking device, on delivery table 7 until the stacked packet 18 is completed. The cutter blade or blades can be either attached to the cutting beam 2 or can rest on cutting table 6.

All movements can be controlled manually; alternatively, the entire program can be run automatically, controlled by switches or the like. At the end of the cutting procedure cutting table 6 rests on guiding frame 4. The cut up fabric as well as the scrap can be taken off therefrom at this point. The cutting table 6 is then returned to its initial position, as shown in FIG. 1. Alternatively, the cutout textile can be taken off in this position of the table.

The installation can be equipped on both sides with a delivery table based on this invention.

To ensure positive synchronization between the conveyor belt 7a and the delivery table, other means, such as chains and chain sprockets, or an electrical synchronizing device can replace the rack. If a rack is used, a plurality of pinions can mesh therewith, instead of relying on just one pinion. However, one pinion is sufficient if the rack is properly mounted.

The installation described hereinabove can also find application in conjunction with a cutting machine of the swing-arm or other types.

The terms and expressions used herein have been used as terms of description and not of limitation as there is not intention, in the use of such terms and expressions, of excluding any equivalents as various modifications are possible within the scope of the invention claimed.

I claim:

1. In a platform-type beam cutting machine having lateral guiding frames for a movable cutting table and a delivery table, the improvement comprising a conveyor belt positioned on said delivery table and drive means operatively connected to said conveyor belt, said drive means being operative in response to the relative movement of one of said tables to the other of said tables, whereby the relative movement of said cutting table, said delivering table and said conveyor belt are such that material positioned on said conveyor belt to be cut remains immovable relative to said cutting table during delivery of said material.

2. An improvement according to claim 1 wherein said conveyor belt moves in an opposite direction to that of said delivery table at the same speed in response to movement of said delivery table.

3. An improvement according to claim 2 wherein said delivery table is provided with a frame, said frame being capable of traversing said guiding frame, said delivery table and said conveyor belt having a common drive means.

4. An improvement according to claim 3 wherein a shaft of a driven roller driving said conveyor belt is affixed to a toothed pinion which intermeshes a pinion on a shaft of a rotary driven member of said delivery table.

5. An improvement according to claim 3 wherein a freewheel assembly in the drive of said conveyor belt is operative in a direction towards said cutting beam.

6. An improvement according to claim 4 wherein a freewheel assembly is positioned between said toothed pinion and said shaft of a driven roller.

7. An improvement according to claim 3 wherein a disengageable clutch assembly is placed in the conveyor belt driveline.

8. An improvement according to claim 6 wherein said guiding frame is provided with teeth spaced along its length and engageable with teeth of a pinion on said shaft of said delivery table.